United States Patent
Agrawal et al.

(10) Patent No.: US 11,256,609 B1
(45) Date of Patent: Feb. 22, 2022

(54) SYSTEMS AND METHODS TO OPTIMIZE TESTING USING MACHINE LEARNING

(71) Applicant: Intec Billing, Inc., Atlanta, GA (US)

(72) Inventors: Ashish Agrawal, Bangalore (IN); Swaroop Rajendra, Bangalore (IN); Meghana Holemadlu Murthy, Mysore (IN); Meenakshi Ambaram Ragavan, Bangalore (IN)

(73) Assignee: Intec Billing, Inc., Atlanta, GA (US)

( * ) Notice: Subject to any disclaimer, the term of this patent is extended or adjusted under 35 U.S.C. 154(b) by 0 days.

(21) Appl. No.: 17/388,151

(22) Filed: Jul. 29, 2021

(30) Foreign Application Priority Data

May 3, 2021 (IN) .............................. 202141020154

(51) Int. Cl.
*G06F 11/36* (2006.01)
*G06F 40/20* (2020.01)
*G06N 20/00* (2019.01)

(52) U.S. Cl.
CPC ...... *G06F 11/3684* (2013.01); *G06F 11/3688* (2013.01); *G06F 40/20* (2020.01); *G06N 20/00* (2019.01)

(58) Field of Classification Search
CPC .. G06F 11/3684; G06F 11/3688; G06F 40/20; G06N 20/00
See application file for complete search history.

(56) References Cited

U.S. PATENT DOCUMENTS

| 7,167,870 | B2 | 1/2007 | Avvari |
| 8,924,938 | B2 | 12/2014 | Chang |
| 9,582,408 | B1 | 2/2017 | Jayaraman |
| 9,720,815 | B2 | 8/2017 | Champlin-Scharff |
| 10,037,264 | B2 | 7/2018 | Chacko |
| 10,430,323 | B2 | 10/2019 | Raman |
| 10,452,523 | B1 | 10/2019 | Vijayalekshmi |
| 11,036,622 | B2 * | 6/2021 | Nochilur ................. G06F 17/18 |
| 11,042,472 | B2 * | 6/2021 | Vidal .................. G06F 11/3684 |
| 2003/0212924 | A1 | 11/2003 | Avvari |
| 2011/0231399 | A1 * | 9/2011 | Zhang .................. G06K 9/6222 707/737 |

(Continued)

OTHER PUBLICATIONS

Anwar, Zeeshan, et al.; Neuro-Fuzzy Modeling for Multi-Objective Test Suite Optimization; 2016; Journal of Intelligent Systems; vol. 25, No. 2; pp. 123-146.

(Continued)

*Primary Examiner* — Douglas M Slachta
(74) *Attorney, Agent, or Firm* — Fitch, Even, Tabin & Flannery LLP (57) ABSTRACT

A machine learning (ML) model is created via training or re-training one or more ML algorithms using past release(s) data (e.g., data comprising of requirements and corresponding test cases). The ML model comprises various clusters and these clusters are dynamically created every time when the ML model is trained (or retrained). One or more requirements exist in each cluster, and each requirement has one or more test cases associated with it. New requirements are mapped to a particular cluster and then test cases are compared against a universe of other test cases to determine whether to add a particular test case to a list of test cases that test the new requirement.

28 Claims, 5 Drawing Sheets

(56) References Cited

U.S. PATENT DOCUMENTS

| | | | |
|---|---|---|---|
| 2015/0193699 A1* | 7/2015 | Kil | G06N 20/00 |
| | | | 706/12 |
| 2015/0363304 A1 | 12/2015 | Nagamalla | |
| 2016/0321586 A1 | 11/2016 | Herzig | |
| 2017/0132203 A1* | 5/2017 | Kim | G06F 16/35 |
| 2017/0169354 A1 | 6/2017 | Diamanti | |
| 2017/0262360 A1* | 9/2017 | Kochura | G06F 40/194 |
| 2018/0144127 A1 | 5/2018 | Duer | |
| 2019/0073293 A1* | 3/2019 | Sharma | G06F 11/008 |
| 2019/0089577 A1 | 3/2019 | Misra | |
| 2019/0171552 A1 | 6/2019 | Mitchell | |
| 2019/0213115 A1* | 7/2019 | Takawale | G06F 8/30 |
| 2019/0227916 A1 | 7/2019 | Yedalla | |
| 2019/0266076 A1* | 8/2019 | Maliani | G06F 11/3688 |
| 2019/0278699 A1 | 9/2019 | Sharma | |
| 2019/0324886 A1 | 10/2019 | Champlin-Scharff | |
| 2020/0019492 A1 | 1/2020 | Fei | |
| 2020/0019493 A1 | 1/2020 | Ramakrishna | |
| 2020/0081445 A1* | 3/2020 | Stetson | G06K 9/6296 |
| 2020/0349395 A1* | 11/2020 | Nushi | G06K 9/6257 |
| 2021/0312361 A1* | 10/2021 | Daley | G06N 20/00 |
| 2021/0334700 A1* | 10/2021 | Nagaraja | G06N 10/00 |

OTHER PUBLICATIONS

Bawar, Zaheer; Using Machine Learning to Refine Black-Box Test Specifications and Test Suites; May 2009; Library and Archive Canada; 157 pages.

Durelli, Vinicius H. S., et al.; Machine Learning Applied to Software Testing: A Systematic Mapping Study; Sep. 3, 2019; IEEE Transactions on Reliability; vol. 68, No. 3; pp. 1189-1212.

* cited by examiner

SYSTEMS AND METHODS TO OPTIMIZE TESTING USING MACHINE LEARNING

TECHNICAL FIELD

Machine learning models and algorithms are used to select and optimize the relevant test cases.

BACKGROUND

Various types of electronic devices can be used to access or utilize electronic services, which typically employ software to perform their functions. Electronic services may include, as examples, electronic voice mail services, call forwarding services, individual calling services, group calling services, electronic billing services, electronic communication services, electronic ordering services, and internet services to mention a few examples.

Services (or portions of the service) are changed or modified as different releases of the services (or portions of the services) are made. In recent times, the release cycles for changes and modifications have become shorter and shorter. Expectations that defects in the software will be fixed more quickly have also increased.

To ensure software quality of the electronic services, after changes and modifications occur the software is tested to ensure that defects or other shortcomings are not present. To do the testing, various test cases are created. Test cases, in aspects, are software programs and/or procedures that test the electronic device or the electronic service, and, more specifically, test the quality of the software that implements a service.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the approaches described herein, a machine learning (ML) model is created via training or re-training one or more ML algorithms using past release(s) data (i.e., data comprising of business requirements and corresponding test cases). The ML model comprises various clusters and these clusters are dynamically created every time when the ML model is trained (or retrained). One or more requirements exist in each cluster, and each requirement has one or more test cases associated with it.

A new requirement or new defect is then received, the new requirement (new defect) is vectorized, and the new vectorized requirement (or defect) is mapped to one of the clusters. Then, each test case in the selected cluster is compared against the universe of test cases from all the other clusters. If the test case from other clusters is similar enough to the test case from the selected cluster, then, that test case from outside the selected cluster is added to a output list for optimized test cases. When this process is finished, then the test cases from the output list are manually or automatically executed.

In many of these embodiments, a machine learning (ML) model is created in an electronic memory device using one or more unsupervised machine learning (ML) algorithms. The machine learning model indicates requirements which describe features of electronic devices or electronic services. The requirements are grouped into a plurality of clusters in the machine learning model. Each of the requirements have an associated requirements vector created using Natural Language Processing (NLP), and each of the requirements in each of the clusters are associated with one or more test cases.

Subsequent to creating the machine learning model, a new requirement is electronically received from a user. The new requirement is vectorized to form a vectorized new requirement.

Using the one or more unsupervised machine learning algorithms, the vectorized new requirement is mapped to a selected one of the plurality of clusters based upon the vectorized new requirement being a closest match with requirements in the selected one of the plurality of clusters.

All test cases are determined associated with all of the requirements of the selected one of the plurality of clusters.

Subsequently and for each of the test cases in the selected one of the plurality of clusters and using a similarity algorithm: a closeness comparison is performed of each test case in the selected one of the plurality of clusters to all other test cases associated with all other clusters of the plurality of clusters; and when the comparison determines a similarity that is within a predetermined threshold similarity, the other test case from the other cluster is added to a list.

When all comparisons are complete, each of the test cases on the list is executed. The executing comprises one or more of: automatically causing an automatic execution of the test case on the list, the automatic execution of the test case causing one or more control signals to be sent to a selected electronic device or selected electronic service, the one or more control signals causing actuation of components, members, or features of the selected electronic device or selected electronic service, and automatically monitoring the results of execution of the test case; and manually causing a manual execution of the test case on the list, wherein a user physically interacts with the device or service to actuate a component or feature of the device or service. Other examples are possible.

Subsequently, the ML model is retrained using any detected defect (which may have leaked/slipped/passed to the next phase or to production and referred to herein as a leaked or slipped defect). The retraining is effective to change the predetermined threshold similarity. In other examples, retraining may result in the creation of a new, currently non-existent test case.

In other aspects, it will be appreciated that the Machine Learning (ML) models described herein can constantly learn in real-time via retraining the ML model with any of the leaked/slipped defects to the next phase (or Production), thus using the reinforcement learning. This results into automatically tuning the predetermined threshold similarity to get the appropriate and pin-pointed test cases to be covered in future by the ML model. In aspects, automatic alerts are generated for manual analysis of the leaked/slipped defects, which may result in corresponding new test cases to be added to the existing Test Suite.

In aspects, the electronic devices comprise one or more of a smart phone, a lap top, a tablet, a cellular phone, or a personal computer. Other examples are possible. In other aspects the one or more test cases comprise executable computer instructions.

In examples, the threshold is dynamic and adjustable. In yet other example, the threshold is fixed.

In other examples, the approach further comprises utilizing, by a user, a testing knowledge service to gain further knowledge of the one or more test cases for the corresponding new incoming requirements.

In other aspects, the electronic services comprise electronic telecommunication services. In yet other aspects, is performed at a central control center. In still other examples, the method is performed at a factory.

In other examples, the closeness comparison determines the similarity between selected test cases by using any of the similarity algorithms. In yet other examples, the electronic model is further refined and physically changed according to the new requirement.

In other aspects, the vectorized new requirement comprises an angle and a magnitude. Other examples are possible.

In still other examples, the vectorized new requirement is created using Natural Language Processing (NLP) approaches. Other approaches can be used as well.

In yet other examples, a user estimates the regression testing effort needed for any new requirements, defects, or enhancements via knowing an exact count of regression test cases to be executed. In some other examples, an automatic identification or identification by a user is made of the suitable manual regression test cases to be automated based on business criticality and repeatability of the regression test cases.

In others of these embodiments, a system comprises a machine learning model, one or more electronic devices and electronic services, an electronic memory device, and a control circuit.

The electronic memory stores the machine learning model, and the machine learning model indicating requirements which describe features of the electronic devices or the electronic services. The machine learning model is created using one or more unsupervised machine learning (ML) algorithms. The requirements are grouped into a plurality of clusters in the electronic model. Each of the requirements have an associated requirements vector, and each of the requirements in each of the clusters are associated with one or more test cases. The vectors are created using Natural Language Processing (NLP).

The control circuit is coupled to the electronic memory device and the one or more electronic devices and electronic services. The control circuit is configured to, subsequent to creating the Machine Learning model, electronically receive a new requirement from a user, and vectorize the new requirement to form a vectorized new requirement. Using the one or more unsupervised machine learning algorithms, the control circuit is configured to map the vectorized new requirement to a selected one of the plurality of clusters based upon the vectorized new requirement being a closest match with the selected one of the plurality of clusters. The control circuit is configured to determine all test cases associated with all of the requirements of the selected one of the plurality of clusters.

Subsequently and for each of the test cases in the selected one of the plurality of clusters and using a similarity algorithm, the control circuit is configured to perform a closeness comparison of each test case in the selected one of the plurality of clusters to all other test cases associated with all other clusters of the plurality of clusters; when the comparison determines a similarity that is within a predetermined threshold similarity, the other test case from the other cluster is added to a list; when all comparisons are complete, executing each of the test cases on the list.

Subsequently, the ML model is retrained using any detected defect (which may have leaked/slipped to next phase or production). The retraining is effective to change the predetermined threshold similarity. In other examples, retraining may result in the creation of a new, currently non-existent test case.

The executing comprises one or more of: automatically causing an automatic execution of the test case on the list, the automatic execution of the test case causing one or more control signals to be sent to a selected electronic device or selected electronic service, the control signal causing actuation of components, members, or features of the selected electronic device or selected electronic service, and automatically monitoring the results of execution of the test case; and manually causing a manual execution of the test case on the list, wherein a user physically interacts with the device or service to actuate a component or feature of the device or service.

In many of the approaches described herein, a machine learning model is created by training the unsupervised machine learning algorithm on the previous requirements, defects and corresponding Test Cases. The model may be a file, in this case, a file with the cluster information.

The approaches described herein utilize unsupervised machine learning algorithms. As used herein, an unsupervised machine learning algorithm learns by analyzing the data without labels (or classifiers) for the hidden structures within it, and through determining the correlations, and for features that actually correlate to two data items. The unsupervised learning algorithm measures the familiarity of incoming new data point with the past seen data points and makes inferences with the comparison like clustering. Unsupervised learning often tries to take advantage of statistical patterns that reoccur in data. In an example, an unsupervised machine learning algorithm may be told to segregate various fruits based upon various photos of fruits processed by the algorithm. The unsupervised machine learning algorithm will look at the color, shape, and texture of each fruit photo and will cluster the similar looking fruits together into one or more clusters. It will then infer any fruit photo to an appropriate cluster. In aspects of the approaches described herein, new requirements are mapped to existing clusters by determining the similarity to the words, phrases, or terms in the requirement to the words, phrases, or terms describing a cluster.

Requirements refer to features, functions, purposes, operating parameters, operational sequences, operational requirements, and/or results required, requested, needed, or expected of an electronic device or service. For example, a group call feature may have a requirement of being able to support five participants (or fewer) in the call. A voice mail requirement may be a function of being able to access the voicemail remotely, or a function of providing a written transcript of every voicemail that is emailed to a user. Other examples are possible. Instead or in addition to requirements, defects (or information indicating defects) can be received. The requirements may be a text file or a file in any other format.

In still others of these embodiments, a Machine Learning (ML) model is created and stored in an electronic memory device using one or more Unsupervised Machine Learning (ML) algorithms. The machine learning model indicates requirements which describe features of electronic devices or electronic services. The requirements are grouped into a plurality of clusters in the machine learning model. Each of the requirements have an associated requirements vector created using Natural Language Processing (NLP), and each of the requirements in each of the clusters are associated with one or more test cases.

Subsequent to creating the machine learning model, a new requirement is electronically received from a user. The new requirement is vectorized to form a vectorized new requirement. Using the one or more unsupervised machine learning algorithms, the vectorized new requirement is mapped to a selected one of the plurality of clusters based upon the vectorized new requirement being a closest match with the selected one of the plurality of clusters. All test cases associated with all of the requirements of the selected one of the plurality of clusters are determined.

Subsequently and for each of the test cases in the selected one of the plurality of clusters and using a similarity algorithm: a closeness comparison is performed of each test case in the selected one of the plurality of clusters to all other test cases associated with all other clusters of the plurality of clusters. When the comparison determines a similarity that is within a predetermined threshold similarity, the other test case from the other cluster is added to a list.

When all comparisons are complete, each of the test cases on the list is executed. The executing is one or more of: automatically causing an automatic execution of the test case on the list, the automatic execution of the test case causing one or more control signals to be sent to a selected electronic device or selected electronic service, the one or more control signals causing actuation of components, members, or features of the selected electronic device or selected electronic service, and automatically monitoring the results of execution of the test case; and manually causing a manual execution of the test case on the list, wherein a user physically interacts with the device or service to actuate a component or feature of the device or service.

The ML model is subsequently retrained automatically in real-time using a detected defect, the detected defect being a leaked or slipped defect occurring during a next phase or during production and being associated with a new feature being added to the electronic device or electronic service that causes failure of an existing feature, the ML model retraining being effective to automatically change the predetermined threshold similarity or manually create one or more new test cases.

Figure 1:
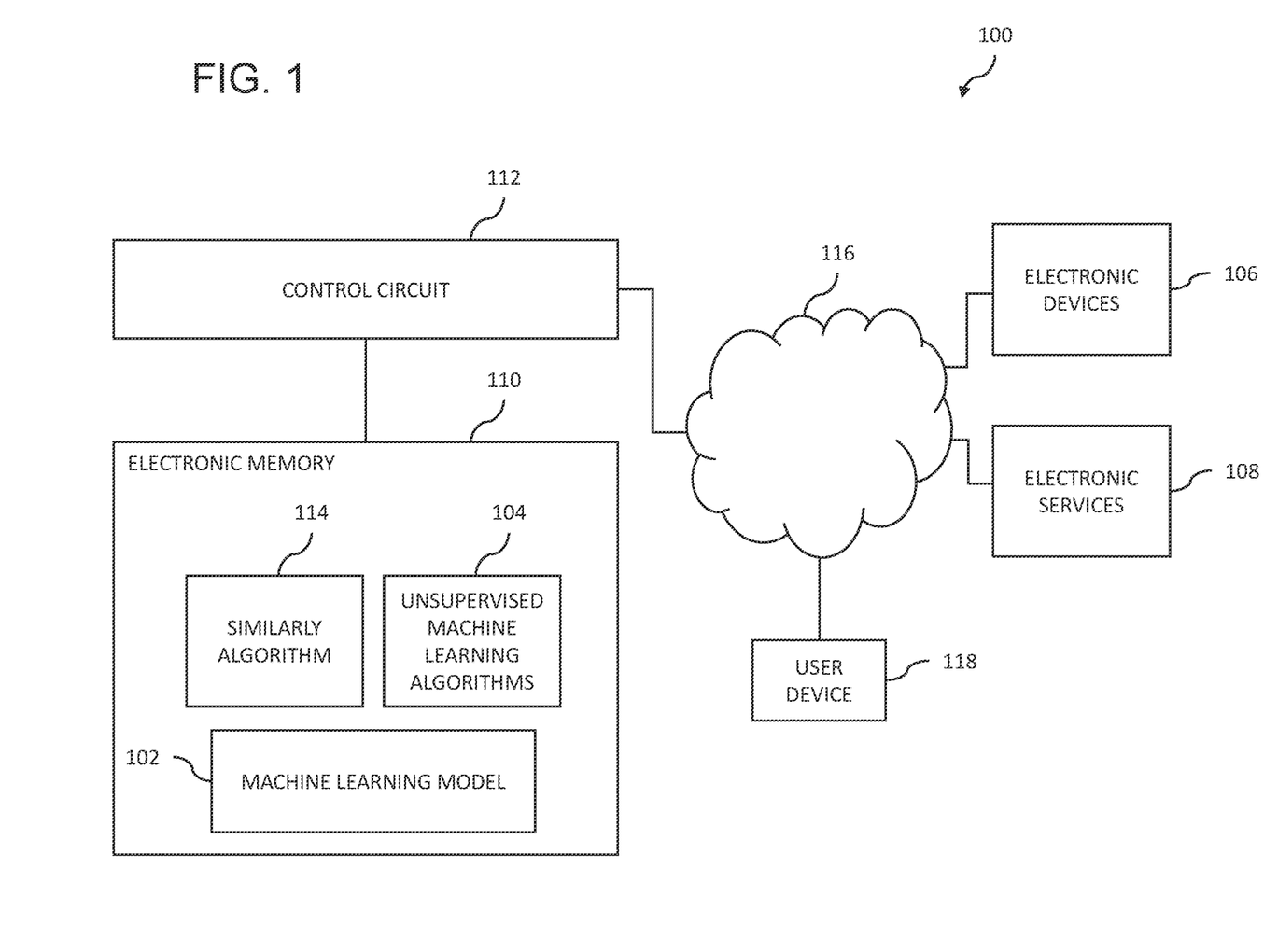
FIG. 1 comprises a diagram of a system according to various embodiments of the present invention.

Referring now to FIG. 1, a system 100 comprises a machine learning model 102, one or more unsupervised machine learning algorithms 104, one or more electronic devices 106, electronic services 108, an electronic memory device 110, and a control circuit 112.

The machine learning model 102 may be any type of data structure stored or included in any file type that includes clusters, requirements, and relationships to test cases.

The one or more unsupervised machine learning algorithms 104 learn by analyzing the data without labels (or classifiers) for the hidden structures within it, and through determining the correlations, and for features that actually correlate to two data items. The unsupervised machine learning algorithms 104 measure the familiarity of incoming new data points with the past seen data points and make inferences with the comparison such as clustering. Unsupervised learning takes advantage of statistical patterns that reoccur in data. In examples, the unsupervised learning algorithms 104 can be implemented as neural networks. If neural networks are used, the networks are structured as a plurality of layers including input, output, and computation layers.

The one or more electronic devices 106 comprise one or more of a smart phone, a lap top, a tablet, a cellular phone, or a personal computer. Other examples of devices are possible. A user communicates new requirements (or defects), and sends or receives other information at a user device 118, which may be a smart phone personal computer, or tablet to mention a few examples. The control circuit 112 and memory 110 are coupled to the electronic devices 106 and electronic services 108 via an electronic network 116. The electronic network 116 may be a cellular network, wireless network, the internet, a wide area network, or a local area network (or combinations of these and other networks) to mention a few examples. The network 116 may include routers, switches, gateways, and other electronic devices that, in aspects, are actuated, changed, or altered as test cases are executed.

The one or more electronic services 108 may be voicemail services, call waiting services, call forwarding services, group calling services, individual calling services, text services, internet services, or accounting services to mention a few examples. Other examples are possible. These services may be implemented at the devices 106 or in the network 116 (or at some other network). In aspects, the services are implemented at least partially as computer software.

The electronic memory device 110 is any type of electronic memory device that stores electronic information. The memory 110 can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory 110 may incorporate electronic, magnetic, optical, and/or other types of storage media. The memory 110 can also have a distributed architecture, where various components are situated remotely from one another, but can be accessed by the processor.

The electronic memory 110 stores the machine learning model 102. The machine learning model 102 includes or indicates requirements which describe features of the electronic devices or the electronic services. The machine learning model 102 is created using the one or more unsupervised machine learning (ML) algorithms 104. In the machine learning model 102, the requirements are grouped into a plurality of clusters. In other words, data or information is applied to the one or more unsupervised machine learning (ML) algorithms 104 to create the machine learning model 102.

Each of the requirements has an associated requirements vector, and each of the requirements in each of the clusters are associated with one or more test cases. The requirements vector is created using Natural Language Processing (NLP).

A Natural Language Processing (NLP) algorithm is an Artificial Intelligence (AI) algorithm which provides computers the ability to map words or phrases from vocabulary to corresponding vectors for real numbers which after mapping is used to find word similarity or semantics. As used herein, the process of converting words into real numbers is called vectorization. The Natural Language Processing (NLP) algorithm can be stored in the memory 110 or be part of the unsupervised machine learning algorithms 104.

The control circuit 112 is coupled to the electronic memory device 110 and the one or more electronic devices 106 and electronic services 108. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 112 may be configured (for example, by using corresponding programming stored in a memory as will be well understood by those skilled in the art) to carry out one or more of the steps, actions, and/or functions described herein. The control circuit 112 may include a memory that includes computer instructions that implement any of the functions described herein.

In one specific example, the control circuit 112, model 102, and algorithms (including the unsupervised machine learning algorithms 104) can be seen to form a testing optimizer engine that includes three blocks: an input block, a machine learning processor block, and an output block.

The input block may be from any source which could be a logging or/and monitoring application or for obtaining the data (like requirements, defects, enhancements from any source, e.g., a user, a bill of materials (BOM), logs, other programs, any Test/Defect/Incident/Task Management tool to mention a few examples). This data is collected and passed to the machine learning processor block.

The machine learning processor block has two layers: a data refinement layer and a data optimizer layer. The data refinement layer obtains the data from the input block via machine learning algorithms, and removes noise from the data. Refined data is passed to the next layer, i.e., the data optimizer layer. The data optimizer layer includes various ML algorithms (as described herein) that determine the converged and optimized test cases appropriate for a particular input. These test cases are passed to the output block, for example, as a list.

The output block may use an existing test execution pipeline or framework to instigate the testing of the test cases. In other examples, it sends notifications to human testers that can either automatically or manually execute the test cases.

The ML engine works by using predictive analytics to determine the optimized, targeted test cases in real-time. In aspects and when these approaches are used in production, defects that are discovered during production are again fed back to the engine as input to thereby apply the adaptive analytics at run-time, keep learning on a continuous basis, and improve the accuracy of the output in the future.

Returning to the operation of the control circuit 112, the control circuit 112 is configured to subsequent to creating the machine learning model 102 (using the one or more unsupervised machine learning algorithms 104), electronically receive a new requirement from a user, and vectorize the new requirement to form a vectorized new requirement. The new requirement can be received via the device 118 in any appropriate form such as electronic text. Using the one or more unsupervised machine learning algorithms 104, the control circuit 112 is configured to map the vectorized new requirement to a selected one of the plurality of clusters based upon the vectorized new requirement being a closest match with the selected one of the plurality of clusters. The control circuit 112 is configured to determine all test cases associated with all of the requirements of the selected one of the plurality of clusters. This is accomplished as described herein using, in aspects, other software programs or the stack of machine learning algorithms 104.

Testing of new requirements may still result into some leaked/slipped defects to the next phase (or Production) and the ML model 102 constantly learns in real-time via retraining the model with these leaked/slipped defects, thus using the reinforcement learning. Thereby, the control circuit 112 tunes the similarity score to get the appropriate and pinpointed test cases to be covered by the ML model 102. The control circuit 112 also alerts for manual analysis of the leaked/slipped defects, which could result in corresponding new test cases to be added to the existing Regression Test Suite.

Subsequently and for each of the test cases in the selected one of the plurality of clusters and using a similarity algorithm 114, the control circuit 112 is configured to perform a closeness comparison of each test case in the selected one of the plurality of clusters to all other test cases associated with all other clusters of the plurality of clusters; when the comparison determines a similarity that is within a predetermined threshold similarity, adding the other test case from the other cluster to a list; when all comparisons are complete, executing each of the test cases on the list.

The similarity algorithm 114 measures how similar or related two objects are. The objects could be word or phrases of words. Various similarity algorithms such as Euclidean distance algorithms, Cosine Similarity algorithms, and Pearson Correlation Coefficient algorithms (to mention a few examples) can be used.

As mentioned, the algorithms 104 are used to initially train the model 102. In aspects and subsequently, a new requirement including a new feature is received. This new requirement may cause an existing feature of a device or service or otherwise to break. In other words, the model 102 may require further tuning because the model 102 has not accounted to regression test correctly for the new requirement. Subsequently, the ML model 102 may be retrained or refined to account for the right regression test cases for the new requirement. This may involve drafting or creating one or more new test cases (that previously did not exist) and/or automatically adjusting the threshold similarity. It will be appreciated, therefore, that the current invention relates to one or more phases of ML model development: training, deployment, and retraining (e.g., after a defect is determined during production or next phase of the Software Development Life Cycle). It will be further appreciated that during training phase, the model is initially trained, and that after the model deployment phase, the trained model is used.

In one particular example, the ML model 102 includes test cases for a voicemail service. Later, a new requirement for a new feature for the voicemail services is vectorized, and an appropriate test case list is generated. But, the new feature causes an existing voicemail feature to fail and the existing test cases did not therefore test the already existing and working feature, which resulted in a slipped/leaked defect to the next phase or production. This leaked/slipped "defect" will be used to retrain the model 102.

The ML model 102 is then retrained or refined using the algorithms 104 and the defect (which has been vectorized) to adjust the model 102. This may cause the adjustment of the similarity threshold included with the model 102 and associated with the voicemail service. A determination may also be made that a new test case (that previously does not exist and may test the existing feature) should be added to the model either automatically or manually (by informing a user to create and add the test case). It will be appreciated that the threshold similarity may be a single threshold or multiple thresholds (e.g., one threshold for each service). It will be appreciated that the threshold may be adjusted in a variety of different ways. For example, the algorithms 104 may incrementally increase (or decrease) the threshold by a certain numerical value upon detection of each new slipped/leaked defect.

In aspects, the similarity algorithm 114, the machine learning model 102, and the one or more unsupervised machine learning algorithms 104 are stored in the electronic memory 110.

The executing of the test cases can include, trigger, or cause various actions to occur. For example, executing the test cases automatically causes an automatic execution of the test case on the list, and the automatic execution of the test case causes one or more control signals to be sent to a selected electronic device 106 or selected electronic service 108. The control signals, in examples, may be generated by the control circuit 112 or some other processing device. The control signals cause actuation of components, members, or features of the selected electronic device 106 or selected electronic service 108. The results of execution of the test case may be automatically or manually monitored. A manual execution of the test case on the list may occur where a user physically interacts with the device 106 or service 108 to actuate a component or feature of the device or service. It will be appreciated that these actions cause members of the physical environment to interact with each other. For example, the control signal may cause the actuation of electronic switches, routers, or servers in an electronic communication network, thereby changing of the state or status of these components, or the transformation of these components.

The approaches described herein relate to the election of test cases that can be manually or automatically applied to devices or services. It will be appreciated that the approaches described herein whether implemented by computer hardware, software, or both can be disposed at a central location or can be disposed locally, or combinations of a central location and remote locations. For example, the control circuit 112 and the electronic memory 110 may be disposed at a central location such as a company headquarters. In other examples, the control circuit 112 and memory 110 may be disposed locally at a factory, business, or some other non-central location.

In examples, the threshold is dynamic and adjustable. In other examples, the threshold is fixed. The threshold can be selected by user testing to determine an appropriate similarity where problems or issues with changes to electronic services is minimized. For example, historical data may suggest that a 90% similarity results in few problems with electronic services or devices.

In other examples, the approach further comprises utilizing, by a user, a testing knowledge service to gain further knowledge of the one or more test cases for the corresponding new incoming requirements. For example, further background and information related to the test cases may be obtained.

In still other aspects, the electronic services 108 comprise electronic telecommunication services. In yet other aspects, is performed at a central control center. In still other examples, the method is performed at a factory.

In other examples, the closeness comparison determines the similarity between selected test cases by using any of the similarity algorithms. In yet other examples, the electronic model is further refined and physically changed according to the new requirement.

In other aspects, the vectorized new requirement created using NLP approaches, comprises an angle and a magnitude. Other examples are possible.

In yet other examples, this current concept can be used as a testing knowledge self-service application. The user may learn what existing tests exist for any new requirements/defects, thus gaining the knowledge for testing of new requirements/defects in a Self-Service manner. The service can additionally be used to locate similar test cases.

In yet other examples, the approaches described herein can be used to find the estimation for the Regression testing effort needed for any new requirements/defects/enhancements by knowing the exact count of Regression Test Cases to be executed.

In yet another example, this approaches described herein can be used to automatically (or by a user) identify the suitable manual Regression Test Cases to be automated based on business criticality and repeatability of the Regression Test Cases.

Figure 2:
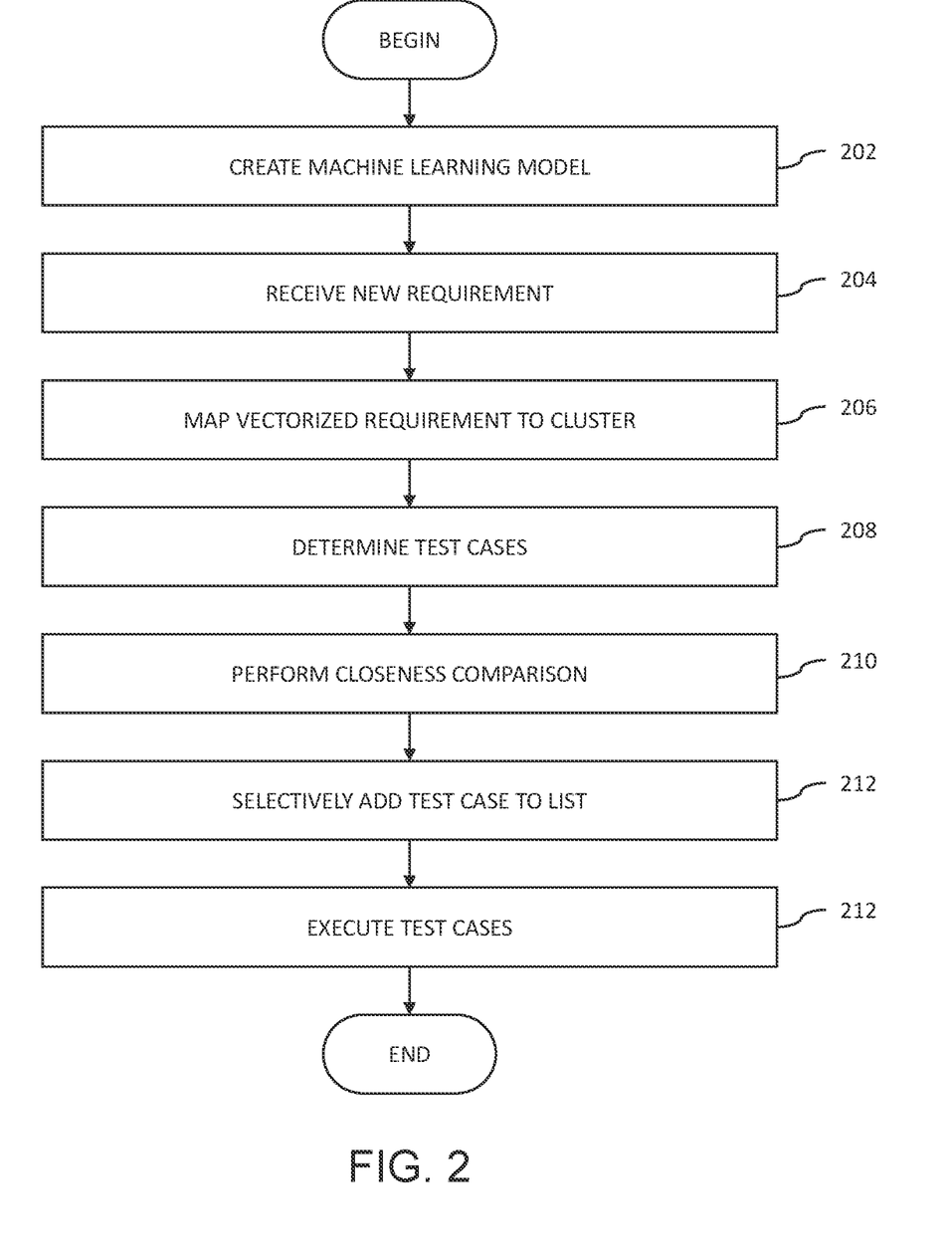
FIG. 2 comprises a flowchart of an approach according to various embodiments of the present invention.

Referring now to FIG. 2, an approach for determining test cases is described.

At step 202, a machine learning (ML) model is created in an electronic memory device using one or more unsupervised machine learning (ML) algorithms. The machine learning model indicates requirements which describe features of electronic devices or electronic services. The requirements are grouped into a plurality of clusters in the machine learning model. Each of the requirements has an associated requirements vector created using Natural Language Processing (NLP), and each of the requirements in each of the clusters are associated with one or more test cases. Other approaches can also be used.

At step 204 and subsequent to creating the machine learning model, a new requirement is electronically received from a user. The new requirement may be associated with an operational aspect of an electronic service or device. The new requirement may be in a text format and is vectorized to form a vectorized new requirement.

At step 206 and using the one or more unsupervised machine learning algorithms, the vectorized new requirement is mapped to a selected one of the plurality of clusters based upon the vectorized new requirement being a closest match with the selected one of the plurality of clusters. Mapping may look at the similarity of the vectorized requirement to a vectorized descriptor of a cluster. For example, if the new requirement seems to relate to "voice mail" (by looking at the similarity of words, phrases, or other information in the requirement), it may be mapped to a cluster of voice mail requirements based upon how similar the requirement is deemed to the term "voice mail" using similarity algorithms.

At step 208, all test cases are determined associated with all of the requirements of the selected one of the plurality of clusters. For example, if the selected cluster has requirements R1 (with test cases TC1 and TC2) and R2 (with test case TC3), TC1, TC2, and TC3 are determined to be the test cases for the cluster.

At step 210, subsequently and for each of the test cases in the selected one of the plurality of clusters and using a similarity algorithm (ML), a closeness comparison is performed of each test case in the selected one of the plurality of clusters to all other test cases associated with all other clusters of the plurality of clusters. For example, if there were two other clusters, with requirements R3 (having test case TC4) in the first of these clusters and R4 (having test cases TC5 and TC6 in the second of these clusters, then TC1 is compared to TC4; TC1 is compared to TC5; TC1 is compared to TC6; TC2 is compared to TC4; TC2 is compared to TC5; TC2 is compared with TC6; TC3 is compared to TC4; TC3 is compared to TC5; TC3 is compared with TC6. Each comparison determines a similarity (e.g., using Euclidean distance algorithms, Cosine Similarity algorithms, and Pearson Correlation Coefficient algorithms to mention a few examples). In aspects, the comparison examines a vector (angle and magnitude) between the two test cases being compared. In other aspects, the vector is an array of numbers representing the frequency of words in a requirement or test case. Other comparisons and vector structures/contents are possible.

At step 212, when the comparison determines a similarity that is within a predetermined threshold similarity, the other test case from the other cluster is added to a list. For example, a comparison is made as to whether a particular similarity is at or above the threshold set by the user or control circuit.

At step 214 and when all comparisons are complete, each of the test cases on the list are executed. In aspects, the execution of the test cases is one or more of: automatically causing an automatic execution of the test case on the list, the automatic execution of the test case causing one or more control signals to be sent to a selected electronic device or selected electronic service, the one or more control signals causing actuation of components, members, or features of the selected electronic device or selected electronic service, and automatically monitoring the results of execution of the test case; and manually causing a manual execution of the test case on the list, wherein a user physically interacts with the device or service to actuate a component or feature of the device or service. It will be appreciated that these actions are physical interactions with physical structures. For example, the components of an electronic network that implements of the service may be opened, closed, and/or have parameters changed.

Figure 3:
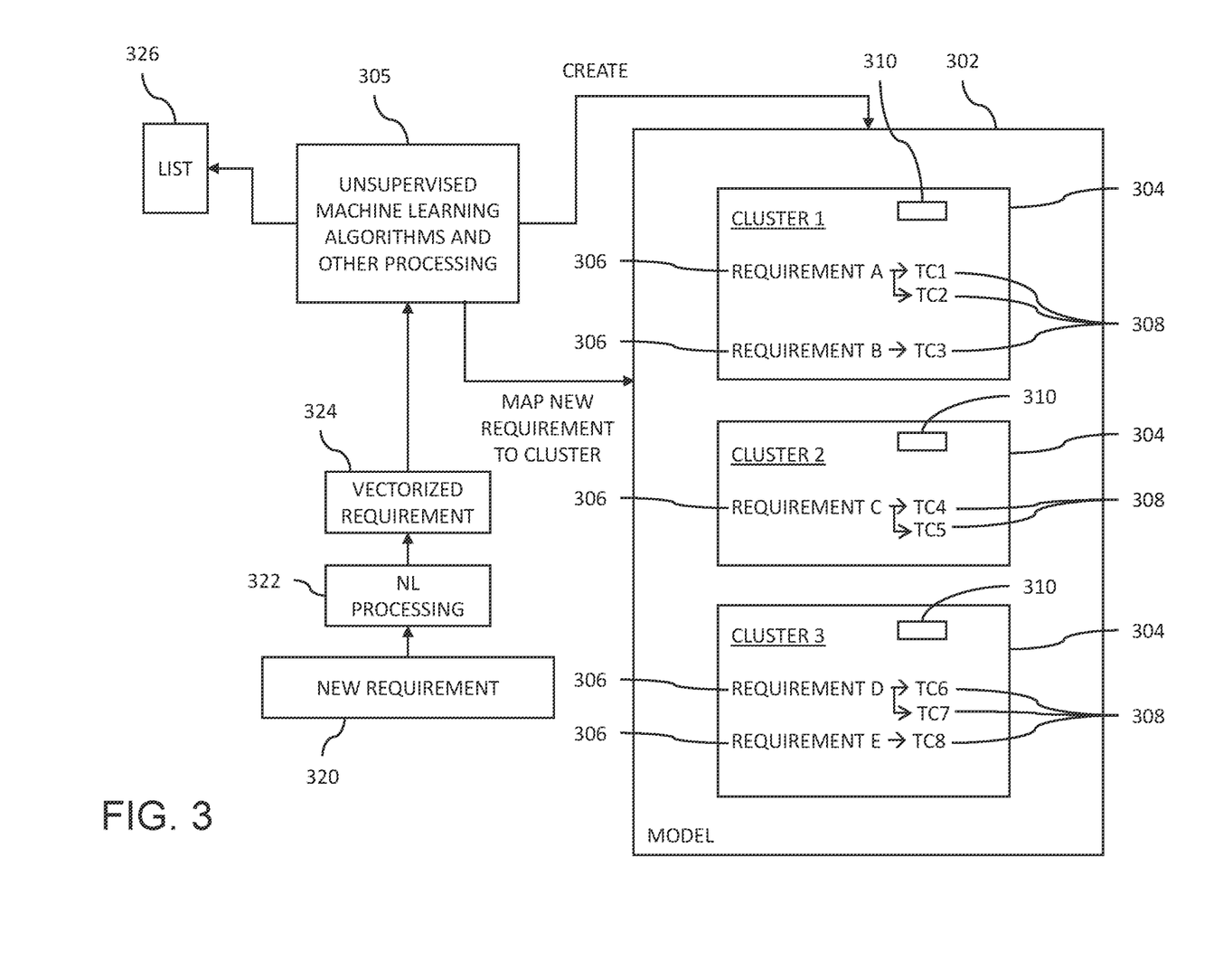
FIG. 3 comprises a diagram of a system according to various embodiments of the present invention.

Referring now to FIG. 3, one example of the operation and implementation of these approaches is described.

A training phase is first undertaken. During the training phase, a machine learning model 302 is created. The machine learning model 302 is created using one or more unsupervised machine learning (ML) algorithms 305. The ML algorithms 305 may be implemented as neural networks or any other type of machine learning approach. The ML model 302 may be constantly re-trained or refined as new data is received, can be retrained or refined at fixed intervals, or can be fixed to mention a few examples.

The ML model 302 constantly learns via retraining the model with the leaked/slipped defects to the next phase (or Production). Using reinforcement learning algorithm, the ML model learns from leaked/slipped defects to thus tune the similarity score to get the appropriate & pin-pointed test cases to be covered by the ML model 302. The ML Algorithms and Other Processing 305 also alerts for manual analysis of the leaked/slipped defects, which could result in corresponding new Test Cases to be added to the Regression Test Suite.

The machine learning model 302 may be a data structure that includes clusters 304, requirements 306 within the clusters 304, and is associated with test cases 308 (or indications of test cases). Each cluster 304 may have a vectorized component 310 that identifies the cluster 304.

The requirements 306 relate to functionality or features of an electronic device or service such as group calling, individual calling, and voicemail to mention a few examples. The test cases 308 are the ones associated to the requirements 306 as per the corresponding functionality.

As mentioned, machine learning algorithms 305 are used to create the clustering structure in the model 302. In this example, the ML algorithms 305 indicate that "group call" requirements belong in cluster 1, individual calling requirements belong in cluster 2, and voicemail requirements belong to cluster 3. Cluster 1 has requirements A and B, Cluster 2 has requirement C, and cluster 3 has requirements D and E. In aspects, there may be no overlap of requirements, i.e., the requirements may be different from all the other requirements.

Requirements 306 are received and are sent to the correct cluster using the ML algorithms 305. These requirements 306 are vectorized by conversion into requirement vectors. The requirements vectors have a magnitude and an angle and are created using Natural Language Processing (NLP). In this way, each of the requirements 306 in each of the clusters 304 is associated with one or more test cases.

After the model 302 is trained, a run or execution phase occurs. The goal of the run or execution phase is to create a set of test cases against the new requirements that are received.

Now, a new requirement 320 arrives. Natural language processing 322 converts the new requirement 320 into key words and is vectorized into requirements vector 324. Now, the appropriate cluster 304 for the new requirement 320 is located. This may be a vectorized comparison with the cluster. "Voice" or "mail" may be in the new requirement 320 and these terms may sound like the new requirement 320 belongs (should be mapped) to a particular cluster where voice mail requirements are disposed. The mapping may be accomplished by using the best available fit for the new requirement (e.g., closest to an existing cluster) using similarity algorithms.

Then, the particular cluster that is chosen has requirements 306, and these are mapped to test cases. For each test case in the cluster, a comparison is performed to the universe of test cases in all the clusters. In this example, Cluster 1 has requirements A (with test cases TC1, TC2) and B (test case TC3), Cluster 2, requirement C (test cases TC4, TC5), and cluster 3 has requirements D (test cases TC6, TC7) and requirements E (test cases TC 8).

Assume Cluster 1 is selected because the new requirement is most similar to requirements in the cluster. Test case TC1 is compared to all test cases not in Cluster 1 (i.e., test cases TC4, TC5, TC 6, TC7, and TC8). A similarity comparison is made between TC1 and TC4, then between TC1 and TC5, and so forth. Assume the threshold is 95%. Assume that TC4 is 97% similar to TC1, and that all the others are less than 95%. Test case TC4 is added to a list 326 (which also includes TC1, TC 2, and TC3). The other test cases are not added. The list 326 is any electronic data structure having any appropriate form or format.

Then, these test cases on the list 326 can be physically implemented. An automatic program (executed by one or more processing device) can include/utilize these and the test cases applied to a service associated with the new requirement 320. Or they can manually be implemented to a service or device associated with the new requirement 320. In this case, since the new requirement 320 is associated with a "group call feature" each of the test cases in the list is implemented against the group call feature in a service.

The test cases, when executed may instigate or cause actions to occur. For example, the test cases may simulate a button push with a control signal. The button push simulation causes something to happen at an electronic device, e.g., a screen gets displayed, a component is changed, or a sound produces by a speaker to mention a few examples.

In another example, a script is presented to a user. In response, a user pushes a button, swipes a screen, and so forth. The user may verify the results of these actions.

In aspects, the approaches herein represent regression testing, that is, verifying that some existing functionality is not broken when a new requirement is added. The Regression Test Cases can be modified to get the Progression Test Cases for new requirements/defects.

Regression testing is a type of testing that confirms/ certifies that a new feature/requirement or defect fix, which has been coded via a program has not adversely affected the working of existing functionality. Progression testing is functional testing in which the tester creates new test cases which test the new functionality/feature. The Progression testing does not confirm/certify the working of existing dependent functionality/feature, which is tested during Regression testing. The Test cases that are created during the Progression test preparation phase are known as Progression Test Cases, however the existing test cases from prior releases/enhancements that are identified for Regression testing are known as Regression Test Cases.

Once the test cases are implemented and based upon the results of the testing, the electronic devices or services may be adjusted, changed, or modified. For example, new software may be added to a service. The new software itself may cause the adjustment of physical devices or components in networks or may adjust the operating parameters of these devices. In still other examples, the device or service may have new hardware installed (e.g., new routers, switches, or other components).

Figure 4:
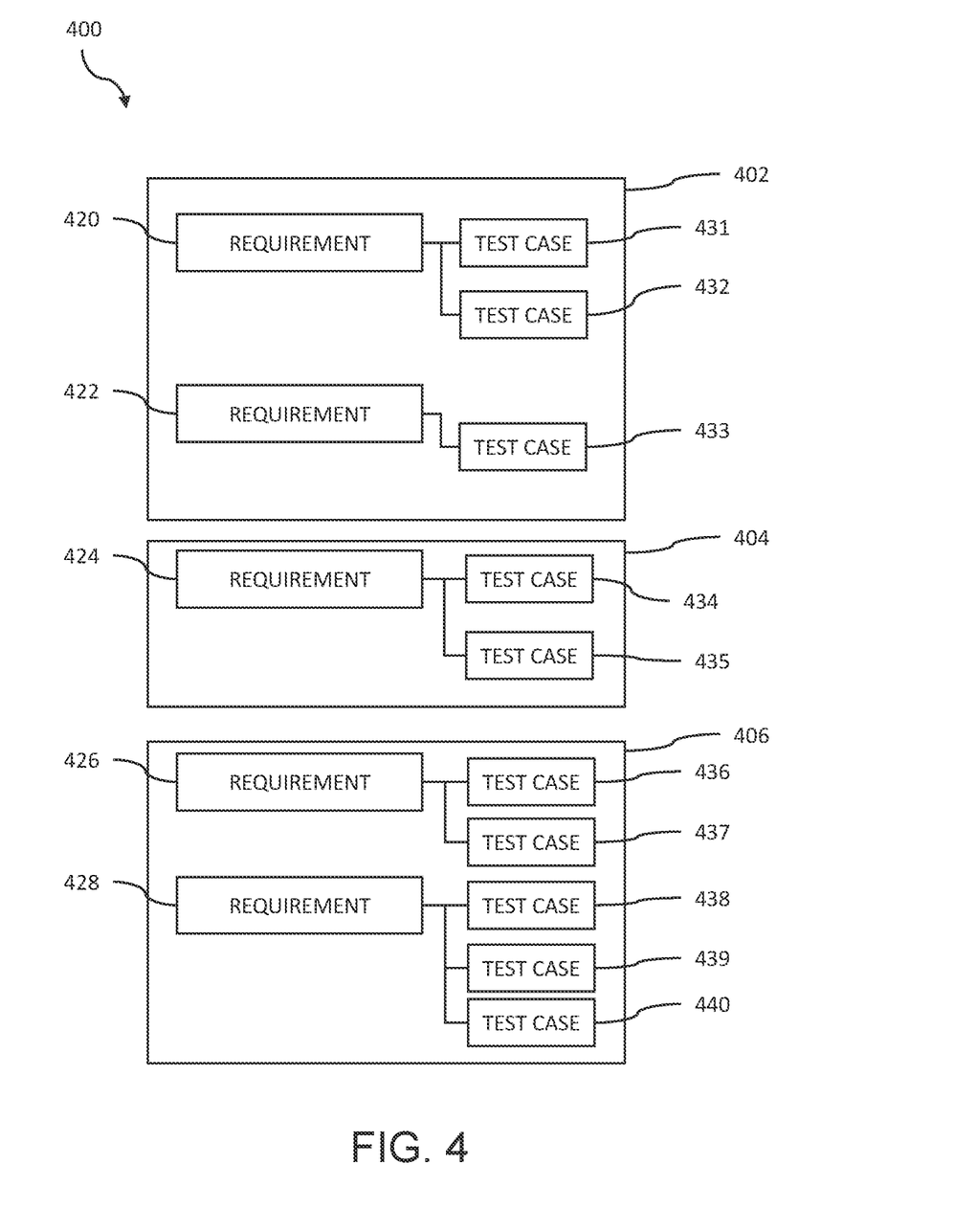
FIG. 4 comprises a diagram of a model of an approach according to various embodiments of the present invention.

Referring now to FIG. 4, one example of a model 400 is described. The model 400 is produced using a stack of unsupervised machine learning algorithms and is contained in any file or file-like structure. The model 400 can be described or represented as any type of data structure or combination of data structure.

The model includes a first cluster 402, a second cluster 404, and a third cluster 406.

The first cluster 402 includes a first requirement 420 and a second requirement 422. The first requirement 420 is associated with a first test case 431 and a second test case 432. The second requirement 422 is associated with a third test case 433.

The second cluster 404 includes a third requirement 424. The third requirement is associated with a fourth test case 434 and a fifth test case 435.

The third cluster 406 includes a fourth requirement 426 and a fifth requirement 428. The fourth requirement is associated with a sixth test case 436 and a seventh test case 437. The fifth requirement 428 is associated with an eighth test case 438, a ninth test case 439, and a tenth test case 440.

Each of the clusters 402, 404, and 406 may have a vector representing the contents of the cluster (i.e., the requirements of the cluster). For example, the cluster 402 may have a vector representing that the cluster is associated with voice mail services.

The association of the test cases with a requirement may be by any appropriate approach. For example, a pointer data structure may point to the appropriate test case residing elsewhere in memory. In other example, the model 400 is a text file. In another example, the name and or identification of the test case may be included in the association. In still other examples, the test case itself (e.g., its software code) may be embedded in the data structure 400. Other examples and combinations are possible.

Figure 5:
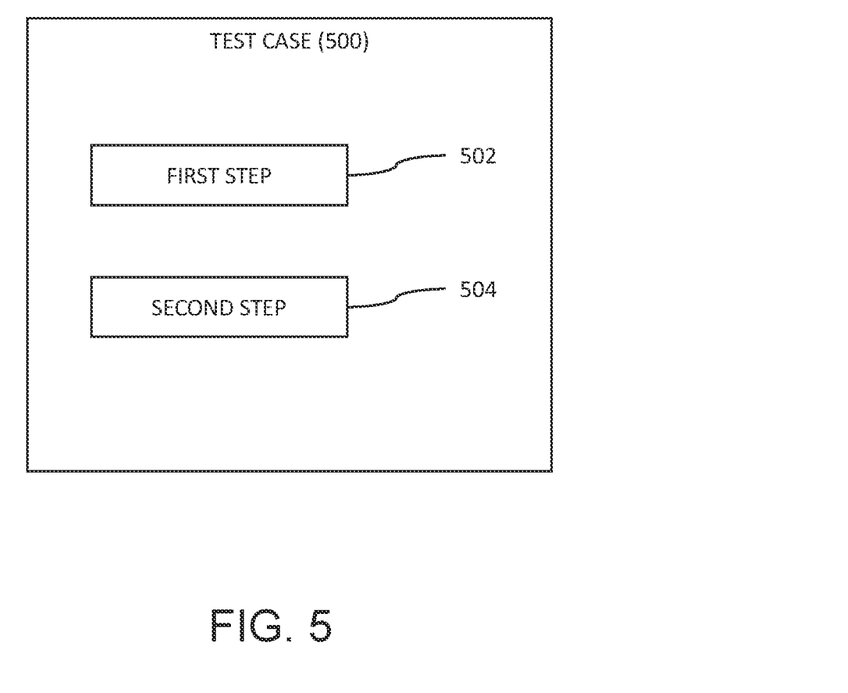
FIG. 5 comprises a diagram of a test case according to various embodiments of the present invention.

Referring now to FIG. 5, one example of a test case 500 is described. The test case 500 includes a first step 502 that tests user interactions with a service such as when a user presses a button. A second step 504 of the test case 500 tests the display of information on a screen. The actual testing in this example is accomplished where the steps are implemented by computer code. In other examples, the test case may be a script that instructs a user to perform the functions instructing the user, for example, to push a button.

It will be appreciated that this is in an example only and that other examples are possible. For example, other test cases may test other features or limits to operation of an electronic device or service.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept

What is claimed is:

1. A method, the method comprising:
    creating and storing an Machine Learning (ML) model in an electronic memory device using one or more Unsupervised Machine Learning (ML) algorithms, the machine learning model indicating requirements which describe features of electronic devices or electronic services, wherein the requirements are grouped into a plurality of clusters in the machine learning model, wherein each of the requirements have an associated requirements vector created using Natural Language Processing (NLP), and wherein each of the requirements in each of the clusters are associated with one or more test cases;
    subsequent to creating the machine learning model, electronically receiving a new requirement from a user;
    vectorizing the new requirement to form a vectorized new requirement;
    using the one or more unsupervised machine learning algorithms, mapping the vectorized new requirement to a selected one of the plurality of clusters based upon the vectorized new requirement being a closest match with the selected one of the plurality of clusters;
    determining all test cases associated with all of the requirements of the selected one of the plurality of clusters;
    subsequently and for each of the test cases in the selected one of the plurality of clusters and using a similarity algorithm:
    perform a closeness comparison of each test case in the selected one of the plurality of clusters to all other test cases associated with all other clusters of the plurality of clusters;
    when the comparison determines a similarity that is within a predetermined threshold similarity, adding the other test case from the other cluster to a list;

when all comparisons are complete, executing each of the test cases on the list, the executing being one or more of:
automatically causing an automatic execution of the test case on the list, the automatic execution of the test case causing one or more control signals to be sent to a selected electronic device or selected electronic service, the one or more control signals causing actuation of components, members, or features of the selected electronic device or selected electronic service, and automatically monitoring the results of execution of the test case; and
manually causing a manual execution of the test case on the list, wherein a user physically interacts with the device or service to actuate a component or feature of the device or service;
wherein the ML model is subsequently retrained automatically in real-time using a detected defect, the detected defect being a leaked or slipped defect occurring during a next phase or during production and being associated with a new feature being added to the electronic device or electronic service that causes failure of an existing feature, the ML model retraining being effective to automatically change the predetermined threshold similarity or manually create one or more new test cases.

2. The method of claim 1, wherein the electronic devices comprise one or more of a smart phone, a lap top, a tablet, a cellular phone, or a personal computer.

3. The method of claim 1, wherein the one or more test cases comprise executable computer instructions.

4. The method of claim 1, wherein the threshold is dynamic and adjustable manually by user or automatically by control circuit.

5. The method of claim 1, further comprising utilizing, by a user, a testing knowledge service to gain further knowledge of the one or more test cases for the corresponding new incoming requirements.

6. The method of claim 1, wherein a user estimates the regression testing effort needed for any new requirements, defects, or enhancements via knowing an exact count of regression test cases to be executed.

7. The method of claim 1, further comprising automatically or by a user identifying the suitable manual regression test cases to be automated based on business criticality and repeatability of the regression test cases.

8. The method of claim 1, where the electronic services comprise electronic telecommunication services.

9. The method of claim 1, wherein the method is performed at a central control center.

10. The method of claim 1, wherein the method is performed at a factory.

11. The method of claim 1, wherein the closeness comparison between selected test cases is determined by using any similarity algorithms.

12. The method of claim 1, wherein the electronic model is further refined and physically changed according to the new requirement.

13. The method of claim 1, wherein the vectorized new requirement comprises an angle and a magnitude.

14. The method of claim 1, wherein the vectorized new requirement is created using NLP.

15. A system, the system comprising:
an electronic model;
one or more electronic devices and electronic services;
an electronic memory device that stores the Machine Learning model, the Machine Learning model indicating requirements which describe features of the electronic devices or the electronic services, wherein the Machine Learning model is created using one or more Unsupervised Machine Learning (ML) algorithms, wherein the requirements are grouped into a plurality of clusters in the electronic model, wherein each of the requirements have an associated requirements vector, and wherein each of the requirements in each of the clusters are associated with one or more test cases;
a control circuit created using Natural Language Processing (NLP), the control circuit being coupled to the electronic memory device and the one or more electronic devices and electronic services, wherein the control circuit is configured to:
subsequent to creating the Machine Learning model, electronically receive a new requirement from a user;
vectorize the new requirement to form a vectorized new requirement;
using the one or more unsupervised machine learning algorithms, map the vectorized new requirement to a selected one of the plurality of clusters based upon the vectorized new requirement being a closest match with the selected one of the plurality of clusters;
determine all test cases associated with all of the requirements of the selected one of the plurality of clusters;
subsequently and for each of the test cases in the selected one of the plurality of clusters and using a similarity algorithm:
perform a closeness comparison of each test case in the selected one of the plurality of clusters to all other test cases associated with all other clusters of the plurality of clusters;
when the comparison determines a similarity that is within a predetermined threshold similarity, adding the other test case from the other cluster to a list;
when all comparisons are complete, executing each of the test cases on the list, the executing being one or more of:
automatically causing an automatic execution of the test case on the list, the automatic execution of the test case causing one or more control signals to be sent to a selected electronic device or selected electronic service, the control signal causing actuation of components, members, or features of the selected electronic device or selected electronic service, and automatically monitoring the results of execution of the test case; and
manually causing a manual execution of the test case on the list, wherein a user physically interacts with the device or service to actuate a component or feature of the device or service;
wherein the ML model is subsequently retrained automatically in real-time using a detected defect, the detected defect being a leaked or slipped defect occurring during a next phase or during production and being associated with a new feature being added to the electronic device or electronic service that causes failure of an existing feature, the ML model retraining being effective to automatically change the predetermined threshold similarity or manually create one or more new test cases.

16. The system of claim 15, wherein the electronic devices comprise one or more of a smart phone, a lap top, a tablet, a cellular phone, or a personal computer.

17. The system of claim 15, wherein the one or more test cases comprise executable computer instructions.

18. The system of claim 15, wherein the threshold is dynamic and adjustable.

19. The system of claim 15, wherein a user utilizes a testing knowledge service to gain further knowledge of the one or more test cases for the corresponding new incoming requirements.

20. The system of claim 15, wherein a user estimates the regression testing effort needed for any new requirements, defects, or enhancements via knowing an exact count of regression test cases to be executed.

21. The system of claim 15, wherein suitable manual regression test cases to be automated are identified automatically or by a user based on business criticality and repeatability of the regression test cases.

22. The system of claim 15, where the electronic services comprise electronic telecommunication services.

23. The system of claim 15, wherein the system is disposed at a central control center.

24. The system of claim 15, wherein the system is disposed at a factory.

25. The system of claim 15, wherein the closeness comparison between selected test cases is determined by using any similarity algorithms.

26. The system of claim 15, wherein the electronic model is further refined and physically changed according to the new requirement.

27. The system of claim 15, wherein the vectorized new requirement comprises an angle and a magnitude.

28. The system of claim 15, wherein the vectorized new requirement is created using NLP.

\* \* \* \* \*